United States Patent
Amann et al.

(10) Patent No.: US 6,422,197 B1
(45) Date of Patent: Jul. 23, 2002

(54) INTAKE SYSTEM

(75) Inventors: Matthias Amann, Remseck; Mark Polifke, Stuttgart; Helmut Spannbauer, Moeglingen, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/698,120

(22) Filed: Oct. 30, 2000

(30) Foreign Application Priority Data

Oct. 29, 1999 (DE) .......................................... 199 52 136

(51) Int. Cl.⁷ .............................................. F02M 35/10
(52) U.S. Cl. ................................. 123/198 E; 55/385.3
(58) Field of Search ....................... 123/198 E, 184.21, 123/195 C, 184.57, 41.7, 41.31; 55/385.3; 180/68.5, 68.2, 68.3

(56) References Cited

U.S. PATENT DOCUMENTS

| | | | |
|---|---|---|---|
| 2,717,045 A | * 9/1955 | Nallinger | 180/68.2 |
| 4,897,097 A | * 1/1990 | Yamamura | 123/198 E |
| 4,976,327 A | * 12/1990 | Abujudom | 180/68.2 |
| 5,542,489 A | * 8/1996 | Allison et al. | 180/68.5 |
| 6,152,096 A | * 11/2000 | Setsuda | 123/184.57 |
| 6,230,677 B1 | * 5/2001 | Setsuda | 123/184.57 |
| 6,230,833 B1 | * 5/2001 | Setsuda | 123/184.21 |

FOREIGN PATENT DOCUMENTS

| | | |
|---|---|---|
| DE | 4412474 | 10/1995 |
| DE | 19725336 | 12/1998 |
| DE | 197 25 336 A1 | * 12/1998 |
| EP | 0745496 | 12/1996 |

OTHER PUBLICATIONS

Copy of Search Report.

* cited by examiner

Primary Examiner—Marguerite McMahon
Assistant Examiner—Hyder Ali
(74) Attorney, Agent, or Firm—Crowell & Moring LLP

(57) ABSTRACT

An intake system 10 which can be used for cooling a battery in a motor vehicle. This intake system 10 has a raw air inlet 11, a raw air duct 12, a filter housing 13, a filter element 14, a clean air outlet 15, a clean air duct 16 and an intake air manifold 17. The filter element 14 is placed in the filter housing 13 such that the air which flows from the raw air inlet 11 through the raw air duct 12 into the filter housing 13, must pass through the filter element 14 before it reaches the clean air duct 16 to the intake air manifold 17. The filter element 14 also has a curvature by which it at least partially follows the contour of a battery box wall 18 of an adjacent battery box 19. The filter element 14 can be made curved or in multiple parts.

10 Claims, 1 Drawing Sheet

INTAKE SYSTEM

BACKGROUND OF THE INVENTION

The present invention relates to an intake system for an internal combustion engine which can be flexibly configured and fit into a small amount of space.

An apparatus for cooling a battery in a motor vehicle is disclosed in published German patent application no. DE 197 25 336. The battery cooling apparatus has a battery housing in which the battery is placed such that a gap is present all around between the battery and the battery housing. The battery box has two ventilation openings. The first air inlet opening is provided with an air connector which draws air from outside the motor vehicle. The second air inlet opening is connected to a duct leading to the intake system of the motor vehicle. The intake system has a raw air intake line which is brought together with the connecting line shortly ahead of a filter housing. In the filter housing there is a filter element to clean the intake air which is fed to an internal combustion engine.

In this apparatus, however, it is not cleaned air from the outside that is fed to the battery box, so that dirt, such as leaves and dust, can collect in the battery housing and clog the gap surrounding the battery. Then the cooling of the battery no longer takes place, but the thermal radiation of the internal combustion engine is directly transferred to the battery. Furthermore, this construction of an apparatus for cooling a battery requires a large amount of space, since all the ducts must be housed, and these have to be kept as straight as possible so as not to have excessive air friction losses, so that the apparatus can not be integrated easily into the motor compartment.

SUMMARY OF THE INVENTION

It is therefore the object of the invention to provide an intake system which can be installed in a small space.

Another object of the invention is to provide an intake system which is adaptable to th shapes of adjacent components.

A further object of the invention is to provide an intake system which can be used to cool the battery of an internal combustion engine.

These and other objects are achieved in accordance with the present invention by providing an intake system for an internal combustion engine, comprising a raw air inlet, a raw air duct into which the raw air inlet opens, the raw air duct communicating with a filter housing, a clean air duct which is connected with the filter housing, an intake air manifold connected to the clean air duct, and at least one filter element disposed in the filter housing such that air entering the filter housing from the raw air duct must pass through the filter element before it can flow out of the filter housing into the clean air duct, in which the filter element is arranged around a battery box such that the filter element follows at least one change in direction of a wall of the battery box, and an interior space formed by walls of the battery box is separated in an air-tight manner from the raw air duct, the filter housing and the clean air duct of the intake system.

The intake system for an internal combustion engine according to the invention is advantageously suitable for cooling a battery for a motor vehicle while requiring only a small space adaptable to the adjacent components. The intake system has a raw air inlet for aspirating air for the internal combustion engine and a raw air duct which is connected on the one hand to the raw air inlet and on the other hand is connected to a filter housing. In the filter housing a filter element is so arranged that a raw air side is sealingly separated from a clean air side. The filter housing contains a clean air outlet which is connected to a clean air duct. The clean air duct is connected with an intake air manifold of the internal combustion engine.

To minimize space for the installation of the intake system the filter element is curved for installation in the filter housing. The curvature of the filter element is such that the filter element follows with at least one curve the curvature of a wall of a contiguous, independent battery box. For this purpose the filter element can be configured in a smooth arc having no corners or abrupt changes of direction. The arc can be semicircular in some embodiments. But curves in the filter element are also conceivable, in which the filter element makes abrupt changes of direction, such as a corner of 90°, for example. Thus the filter element can follow the contour of the battery box wall in at least two directions. The battery box encloses an interior space into which a battery for the motor vehicle can be installed. In any embodiment of the air-carrying elements of the intake system, the interior space formed by the battery box is separated in an air-tight manner from the air-carrying elements of the intake system, so that no flow of the intake air takes place in the interior of the battery box and contamination of the interior is prevented.

An advantageous embodiment of the intake system provides a connection between the filter housing and the battery box, so that the position of the two parts in relation to one another can be fixed. This connection can be made releasable or unreleasable. Screws can serve as releasable means which fasten portions of both parts together. Another releasable means would be fastening the two parts together with latches. For this purpose either the battery box or the filter housing has a receptacle into which a mating piece on the other part is latched. Furthermore the filter housing and the battery box might be fitted one into the other, with one of the two parts having a socket and the other part a plug. To create an inseparable joining of the parts to one another they can be cemented or welded.

In another embodiment of the inventive concept, the battery box forms part of the filter housing, and the air-tight separation of the air-carrying elements such as filter housing, raw air duct or clean air duct and the interior space of the battery box is accomplished by a dividing wall. The filter housing can be comprised of a frame and a housing cover, the frame being joined sealingly to the battery box. This can be done by cementing, welding, screwing or riveting.

In one especially advantageous embodiment of the inventive concept the filter housing and the battery box are formed together in one piece. In this case no elements need be provided for joining the two parts together. Furthermore, their position with respect to one another is precisely defined and cannot be shifted during assembly. Other advantages of this embodiment are weight savings and a smaller installation space since one component wall and the joining elements can be omitted.

Another variant of the invention provides that the battery box is surrounded by the air-carrying elements of the intake system, as for example the raw air or clean air ducting. For this purpose these air-carrying elements can be in contact with the battery box wall at a plurality of sides of the battery box. The air-carrying elements can be joined to the battery box wall by screwing, cementing, welding or latching, for example, or in part by the battery box wall. Also possible is an embodiment in which the air-carrying elements are carried as insulation around the battery box but have no direct connection to the battery box.

In other embodiments of the invention the filter element can be placed into a filter element receptacle, which is situated either in a housing body or a housing cover, with the housing body and the housing cover forming the filter housing. The filter element receptacle can be configured as a contour in one of the two filter housing parts. Moreover, it is possible to construct the filter element receptacle as an independent component, e.g., in the form of a frame. For this purpose the filter element is placed in the filter element receptacle. This can be done in the filter housing or outside of the filter housing. The filter element receptacle then can be placed in the housing body or the housing cover.

One specific embodiment of the filter housing involves the use of sliding latches for fastening the housing cover to the housing body. The housing cover can be fastened to the housing body by one or more plug sockets on one side, and to fasten it air-tight it can be affixed at another side with the sliding latches. This fastening method offers good contact force over a large area, assuring the sealing of the filter housing and offering a secure fastening which is easy to release for maintenance operations. As an alternative to the sliding latches, embodiments with snap-hooks, buckles or screws can be used.

It is advantageous that the raw air duct enters a tapering passage at its greatest cross section. This passage can be formed by the filter housing at one end. Directing the flow of air toward the filter element through a tapering passage results in a better distribution of the air and thus a longer filter element service life.

Another specific embodiment of the idea of the invention provides for a tapering passage over a filtering surface of the filter element, which is formed by the filter element and the filter housing. In this embodiment the filter element is in the form of a rectangular cartridge which is inserted in curved form into the filter element receptacle. The rectangular filter element has four sides or edges arranged in opposing pairs. The curvature of the filter element is arcuate, such that two sides are curved and two sides are not curved. The opposite sides are parallel to one another even in the curved state. The curved margins have no sharp bends, kincks or corners. Furthermore, the curved filter element is placed into the filter housing such that the convex side of the filter element faces the tapering passage. The raw air duct is connected to the tapering passage in an area where the passage has its greatest cross section. In addition, the raw air duct is attached such that the air strikes the filter element virtually tangentially. This embodiment is optimally streamlined, so that the filter element is swept uniformly over its entire filter surface and the service life of the filter element can thereby be lengthened.

It is advantageous that the filter housing and the battery box are manufactured by plastic injection molding. Thus complex contours can easily be produced; furthermore, plastic models have a low component weight.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
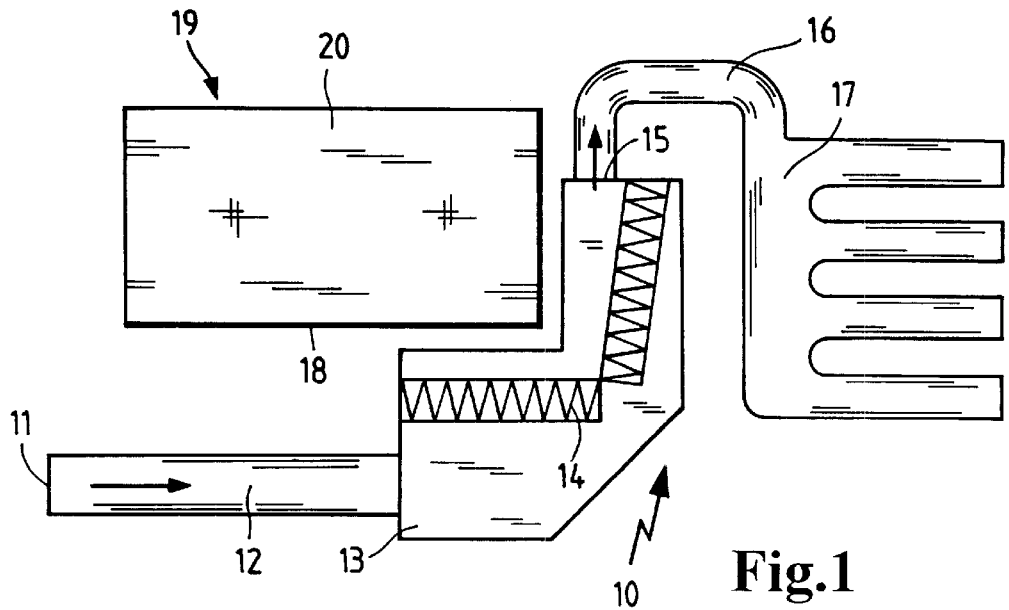
FIG. 1 shows a schematic structure of an intake system.

In FIG. 1 an intake system 10 is shown schematically. The intake system 10 comprises at least one raw air inlet 11, a raw air duct 12, a filter housing 13, a filter element 14, a clean air outlet 15, a clean air duct 16 and an intake air manifold 17. The raw air duct 12 and the clean air duct 16 are connected to the filter housing 13. The filter element 14 is sealingly placed in the filter housing 13 so that the air flowing into the filter housing from the raw air duct 12 must pass through the filter element 14 to reach the clean air duct 16. Also, the filter element 14 is disposed in the filter housing 13 such that it adapts to the shape of a battery box wall 18 which forms a battery box 19 with an interior space 20. The filter element 14 is a flat cartridge and may be curved or it may be comprised of a plurality of parts sealingly joined to each other. The filter element 14, however, does not need to have precisely the same geometry as the outline of the battery box 19. A moderate approximation of this outline is sufficient to make optimum use of the available installation space. The air-carrying elements 12, 13, 16 and 17 have no junctions with the battery box 19. The interior space 20 in which a battery (not shown) can be placed, is separated from the air-carrying elements 12, 13, 16 and 17 in an air tight manner.

Figure 2:
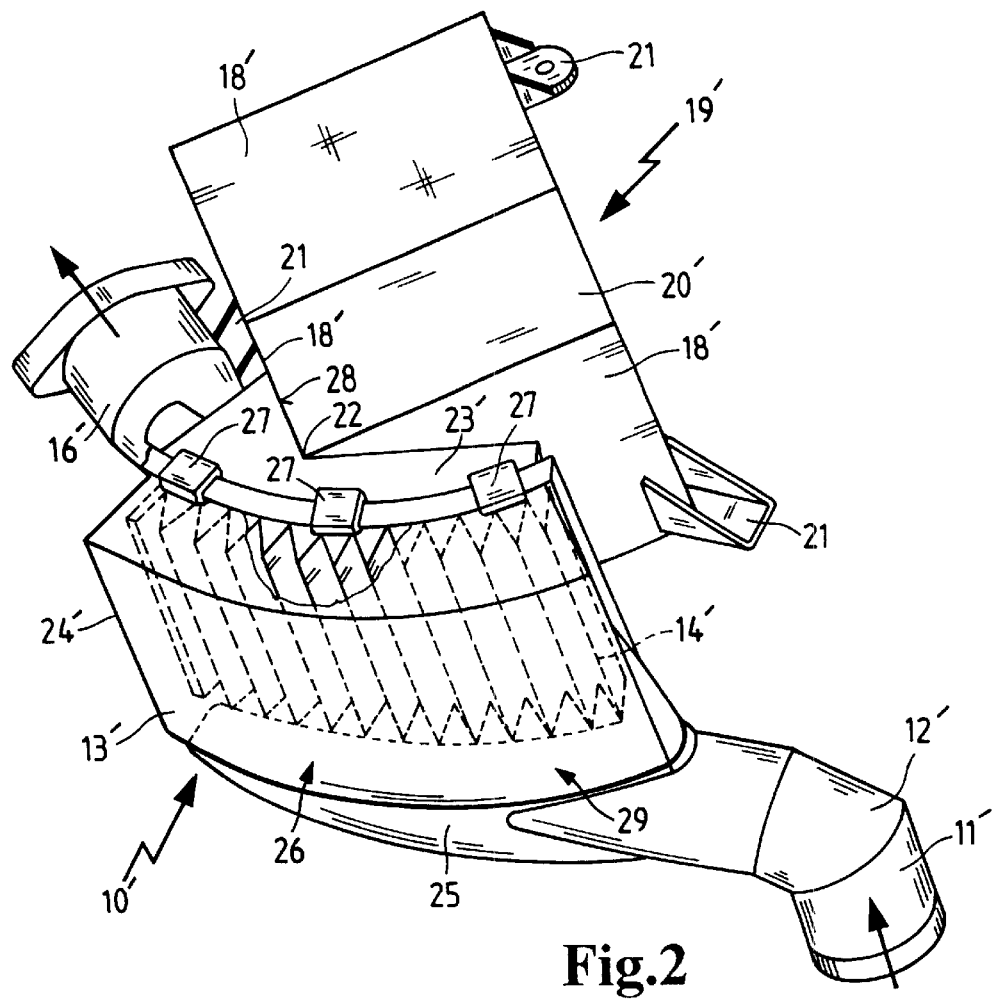
FIG. 2 shows a perspective view of the intake system according to the present invention.

In FIG. 2 an intake system 10' is illustrated in a perspective view in which the intake air manifold 17 of FIG. 1 is not shown. In this embodiment, the battery box 19' and the filter housing 13' are made in one piece, so that the battery box wall 18' forms part of a housing body 23' which together with a housing cover 24' forms the filter housing 13'. The battery box 19' includes mounting feet 21 for fastening the battery box 19' to a vehicle body (not shown). The battery box wall 18' is impermeable to air and forms a dividing wall 28 between the interior space 20' and a filter chamber 29. The filter element 14' is curved in the filter housing 13' so that the concave side of the filter element at least partially follows a contour of the battery box since a corner 22 of the battery box 19' is surrounded. The housing cover 24' in this embodiment is connected to the raw air duct 12'. Raw air duct 12' leads into a tapering passage 25, which is disposed on one end 26. The housing cover 24' is fastened with latches 27 to the housing body 23'. In this embodiment, the latches are in the form of sliding clips. The sliding clips 27 can be slid between an open position and a closed position. When the sliding clips 27 are switched to the closed position a latching is produced, which produces a rattle-proof connection between the housing parts 23' and 24'. This connection, however, can easily be opened by hand by pulling open the latches 27.

What is claimed is:

1. An intake system for an internal combustion engine, comprising a raw air inlet, a raw air duct into which said raw air inlet opens, said raw air duct communicating with a filter housing, a clean air duct which is connected with the filter housing, an intake air manifold connected to said clean air duct, and at least one filter element disposed in said filter housing such that air entering said filter housing from the raw air duct must pass through the filter element before it can flow out of the filter housing into the clean air duct; wherein the filter element is arranged around a battery box such that the filter element follows at least one change in direction of a wall of the battery box, and an interior space formed by walls of the battery box is separated in an air-tight manner from the raw air duct, the filter housing and the clean air duct of the intake system.

2. An intake system according to claim 1, wherein the filter housing and the battery box are joined together.

3. An intake system according to claim 1, wherein the battery box forms a part of the filter housing, said battery box including a dividing wall which separates the interior space of the battery box from the raw air duct, filter housing and clean air duct in an air-tight manner.

4. An intake system according to claim 3, wherein the filter housing and the battery box are made in one piece.

5. An intake system according to claim 1, wherein the battery box is at least partially surrounded by the raw air duct, the filter housing and the clean air duct of the intake system.

6. An intake system according to claim 1, wherein the filter housing comprises a housing body and a housing cover, and a filter element receptacle is provided in the housing body for the filter element.

7. An intake system according to claim 6, further comprising at least one latch for securing the housing cover to the housing body.

8. An intake system according to claim 1, wherein the raw air duct leads into a tapering passage in said filter housing.

9. An intake system according to claim 8, wherein said tapering passage is formed by the filter element and the filter housing, and wherein the filter element is a rectangular insert bent to a curved configuration and inserted into the filter element receptacle such that one pair of opposite sides of the rectangular filter element are parallel and the other pair of opposite margins are smoothly curved without any corners, the curved filter element having a convex side which faces the raw air duct, and the raw air duct opening into the tapering passage in such a way that the raw air duct is directed toward the filter element in a maximum cross section area of the tapering passage.

10. An intake system according to claim 1, wherein the filter housing and the battery box are comprised of injection molded synthetic resin parts.

* * * * *